United States Patent
Li

(10) Patent No.: US 9,535,276 B2
(45) Date of Patent: Jan. 3, 2017

(54) LIQUID CRYSTAL PANEL MOTHERBOARD NEEDING SLICING AND MANUFACTURING METHOD THEREOF

(71) Applicant: Shenzhen China Star Optoelectronics Technology Co., Ltd., Shenzhen, Guangdong (CN)

(72) Inventor: Dong Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 135 days.

(21) Appl. No.: 14/117,029

(22) PCT Filed: Aug. 20, 2013

(86) PCT No.: PCT/CN2013/081887
§ 371 (c)(1),
(2) Date: Nov. 11, 2013

(87) PCT Pub. No.: WO2015/021662
PCT Pub. Date: Feb. 19, 2015

(65) Prior Publication Data
US 2015/0055064 A1 Feb. 26, 2015

(30) Foreign Application Priority Data
Aug. 15, 2013 (CN) .......................... 2013 1 0355145

(51) Int. Cl.
*G02F 1/13* (2006.01)
*G02F 1/1333* (2006.01)

(52) U.S. Cl.
CPC ..... *G02F 1/133351* (2013.01); *G02F 2201/50* (2013.01)

(58) Field of Classification Search
CPC .............. G02F 1/133351; G02F 1/1345; G02F 1/13458
See application file for complete search history.

(56) References Cited

U.S. PATENT DOCUMENTS

2004/0212884 A1* 10/2004 Satake et al. ................. 359/490
2006/0290878 A1* 12/2006 Shin ............................. 349/190
(Continued)

FOREIGN PATENT DOCUMENTS

WO    WO 2012073456 A1 *  6/2012

*Primary Examiner* — Richard Kim
(74) *Attorney, Agent, or Firm* — Andrew C. Cheng

(57) ABSTRACT

A liquid crystal panel motherboard need slicing is proposed. The liquid crystal panel motherboard includes a main substrate disposed at one side of a CF (2) and a main substrate disposed at one side of a TFT (1). The liquid crystal panel motherboard can be sliced to be at least two liquid crystal panels including a CF substrate (20) and a TFT substrate (10). Metallic terminal parts are formed on each TFT substrate (10). A soft protective film (24) is disposed on a touching area (22) connected to each metallic terminal part of the TFT substrate (10) connected to the CF substrate (20). The soft protective film (24) has a certain thickness and leans against its corresponding metallic terminal part on a main substrate at the side of the TFT (1). A manufacturing method of the liquid crystal panel motherboard needing slicing is also proposed. The present invention has an advantage of preventing the metallic terminal part of the TFT substrate from being scraped when the liquid crystal panel motherboard is sliced, thereby improving the production yield rate.

6 Claims, 4 Drawing Sheets

(56) References Cited

U.S. PATENT DOCUMENTS

2012/0154734 A1* 6/2012 Kaneko .......................... 349/158
2013/0242242 A1* 9/2013 Saida ............................. 349/113

* cited by examiner

LIQUID CRYSTAL PANEL MOTHERBOARD NEEDING SLICING AND MANUFACTURING METHOD THEREOF

CROSS-REFERENCE TO RELATED APPLICATION

This application claims priority from and the benefit under 35 U.S.C. §119(a) of Chinese Patent Application No. 201310355145.9, filed on Aug. 15, 2013, which is hereby incorporated by reference for all purposes as if fully set forth herein.

BACKGROUND OF THE INVENTION

1. Field of the Invention

The present invention relates to the field of manufacturing technology of a thin film transistor liquid crystal display (TFT-LCD), and more particularly, to a liquid crystal panel motherboard needing slicing and a manufacturing method thereof.

2. Description of the Prior Art

One of the manufacturing processes of a liquid crystal panel is that a liquid crystal panel motherboard needing slicing is sliced to liquid crystal panels with various desired sizes by using a cutting machine.

FIG. 1 is a schematic diagram showing that a conventional liquid crystal panel motherboard is sliced. FIG. 2 is a side view showing the conventional liquid crystal panel motherboard. FIG. 3 is a schematic diagram showing the conventional liquid crystal panel motherboard which finishes being sliced. Please refer to FIGS. 1 to 3. The conventional liquid crystal panel motherboard comprises a main substrate at one side of a TFT (thin film transistor) 1 and a main substrate at one side of a CF (color filter) 2. The main substrate at the side of the TFT 1 is disposed correspondingly on top of the main substrate at the side of the CF 2. The liquid crystal panel motherboard can be sliced to be at least a plurality of liquid crystal panels comprising a CF substrate 20 and a TFT substrate 10. A plurality of metallic terminal parts (not shown) are formed on each of the TFT substrates 10. A contact area 22 (i.e., a dotted box shown in FIG. 2) which touches each of the metallic terminal parts is disposed on the CF substrate 20. The liquid crystal panel motherboard is disposed on an upper support platform 30 and a lower support platform 31. As shown in FIG. 1, the liquid crystal panel motherboard is sliced with a cutting knife 4 (schematically shown in FIG. 1) of a cutting machine along a cutting line (i.e., a dotted line in FIG. 1) in one embodiment. The main substrate at the side of the TFT 1 is sliced on the top. The main substrate at the side of the CF 2 is sliced at the bottom.

After the slicing process is done, the lower support platform 31 carries the liquid crystal panel comprising the CF substrate 20 and the TFT substrate 10 away along the cutting line. At this time, the liquid crystal panel is pushed to the lower support platform 31 from the upper support platform 30, which implies that the lower support platform 31 is lower than the upper support platform 30. However, the TFT substrate 10 of the liquid crystal panel on the lower support platform 31 easily rubs the CF substrate 20 of the liquid crystal panel on the upper support platform 30 because of this structure. As a result, the metallic terminal of the metallic terminal part of the TFT substrate 10 will be scraped, thereby causing malfunction of the liquid crystal panel.

SUMMARY OF THE INVENTION

An object of the present invention is to provide a liquid crystal panel motherboard needing slicing and a manufacturing method thereof. The liquid crystal panel motherboard is used for preventing a metallic terminal part of a TFT substrate from being scraped.

According to the present invention, a liquid crystal panel motherboard needing slicing, comprises: a main substrate at one side of a thin film transistor (TFT) and a main substrate at one side of a color filter (CF), the main substrate at the side of the TFT disposed on top of the main substrate at the side of the CF, the main substrate at the side of the TFT and the main substrate at the side of the CF being overlapped, and the liquid crystal panel motherboard is capable of being sliced into at least two liquid crystal panels comprising a CF substrate and a TFT substrate;

a plurality of metallic terminal parts formed on the TFT substrate of each of the liquid crystal panels, a soft protective film disposed on a contact area which touches each of the plurality of metallic terminal parts disposed on the TFT substrate corresponding to the CF substrate;

wherein the soft protective film comprises a certain thickness and leans against a corresponding metallic terminal part on a corresponding TFT substrate for preventing the metallic terminal in the metallic terminal part on the TFT substrate from being scraped when the liquid crystal panel motherboard is sliced.

Furthermore, the soft protective film comprises strips of soft protective films coated at intervals on the contact area of the CF substrate which corresponds to the metallic terminal part, or the soft protective film comprises a whole soft protective film coated on the contact area of the CF substrate which corresponds to the metallic terminal part.

Furthermore, an area where the soft protective film is coated on the CF substrate is larger than an area of a corresponding metallic terminal part.

Furthermore, the soft protective film is fabricated from polystyrene (PS) or polyethylene (PE).

Furthermore, a thickness of the soft protective film is between 1 and 4 um.

According to the present invention, a liquid crystal panel motherboard needing slicing, comprises: a main substrate at one side of a thin film transistor (TFT) and a main substrate at one side of a color filter (CF), the main substrate at the side of the TFT disposed on top of the main substrate at the side of the CF, the main substrate at the side of the TFT and the main substrate at the side of the CF being overlapped, and the liquid crystal panel motherboard sliced to at least two liquid crystal panels comprising a CF substrate and a TFT substrate;

a plurality of metallic terminal parts formed on the TFT substrate of each of the liquid crystal panels, a soft protective film disposed on a contact area which touches each of the plurality of metallic terminal parts disposed on the TFT substrate corresponding to the CF substrate, and the area where the soft protective film is coated on the CF substrate being larger than the area of a corresponding metallic terminal part;

wherein the soft protective film comprises a certain thickness and leans against a corresponding metallic terminal part on a corresponding TFT substrate for preventing the metallic terminal in the metallic terminal part on the TFT substrate from being scraped when the liquid crystal panel motherboard is sliced.

Furthermore, the soft protective film comprises strips of soft protective films coated at intervals on the contact area of the CF substrate which corresponds to the metallic terminal part, or the soft protective film comprises a whole soft protective film coated on the contact area of the CF substrate which corresponds to the metallic terminal part.

Furthermore, thickness of the soft protective film is between 1 and 4 um.

Furthermore, the soft protective film is fabricated from polystyrene (PS) or polyethylene (PE).

According to the present invention, a manufacturing method of a liquid crystal panel motherboard needing slicing comprises following steps of:

supplying a main substrate at one side of a TFT, the main substrate at the side of the TFT being capable of being sliced into a plurality of TFT substrates, and a plurality of metallic terminal parts being formed on each of the plurality of TFT substrates;

supplying a main substrate at one side of a CF, the main substrate at the side of the CF and the main substrate at the side of the TFT being disposed together and overlapped, the main substrate at the side of the CF being capable of being sliced into CF substrates, and the CF substrates being as many as the TFT substrates;

forming a plurality of CF substrates on the main substrate at the side of the CF after the main substrate at the side of the CF undergoes some processes, and coating a soft protective film on a contact area where the motherboard at the side of the CF touches the metallic terminal part of the TFT substrate, wherein the soft protective film comprises a certain thickness and leans against a corresponding metallic terminal part on the main substrate at the side of the TFT substrate for preventing the metallic terminal in the metallic terminal part on the TFT substrate from being scraped when the liquid crystal panel motherboard is sliced;

gluing the main substrate at the side of TFT to the main substrate at the side of the CF, and infusing liquid crystal into an area between the main substrate at the side of TFT and the main substrate at the side of the CF.

Furthermore, the practical process that the soft protective film is coated on an area where the motherboard at the side of the CF touches the metallic terminal part of the TFT substrate is that:

a plurality of strips of soft protective films are coated at intervals on each of the contact areas of the motherboard at the side of the CF, or the soft protective film is completely coated on each of the contact areas of the motherboard at the side of the CF.

Furthermore, the area where the soft protective film is coated is larger than an area of its corresponding metallic terminal part.

Furthermore, the soft protective film is fabricated from polystyrene (PS) or polyethylene (PE).

Furthermore, a thickness of the soft protective film is between 1 and 4 um.

The embodiment of the present invention has a benefit as follows:

A soft protective film is disposed on a contact area where the CF substrate touches the metallic terminal part of the TFT substrate in one embodiment of the present invention. The soft protective film is used as a buffer and for protecting the metallic terminal part of the TFT substrate from being rubbed by the CF substrate. Thus, the metallic terminal in the metallic terminal part of the TFT substrate is prevented from being scraped. In this way, success rate of slicing the liquid crystal panel motherboard is increased, thereby improving the production yield rate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

The preferred embodiment of the present invention incorporating with the accompanying drawings is described.

Figure 1:
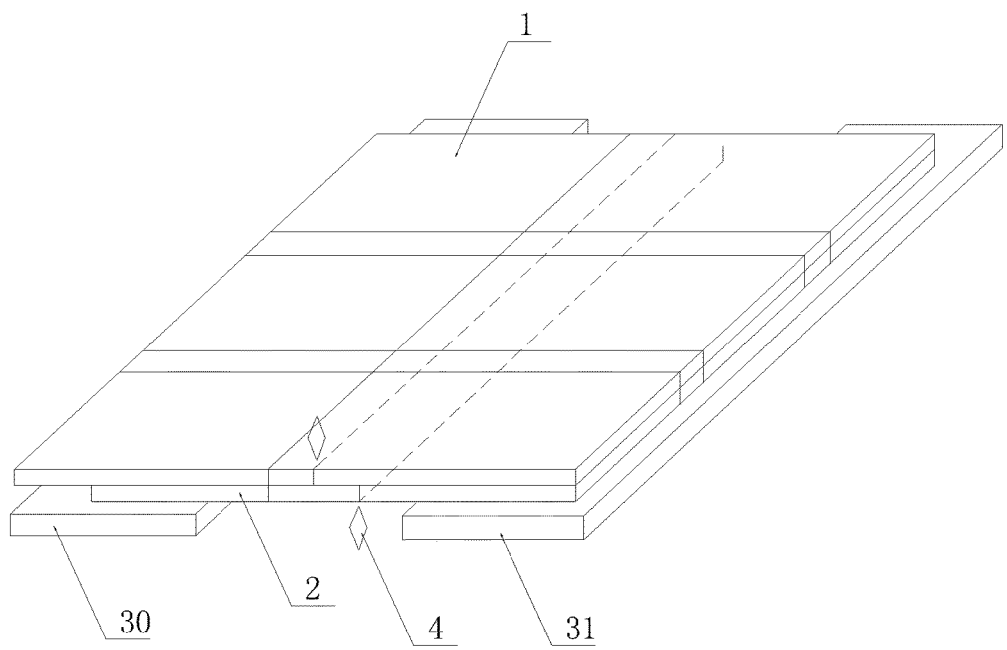
FIG. 1 is a schematic diagram showing that a conventional liquid crystal panel motherboard is sliced.
Figure 2:
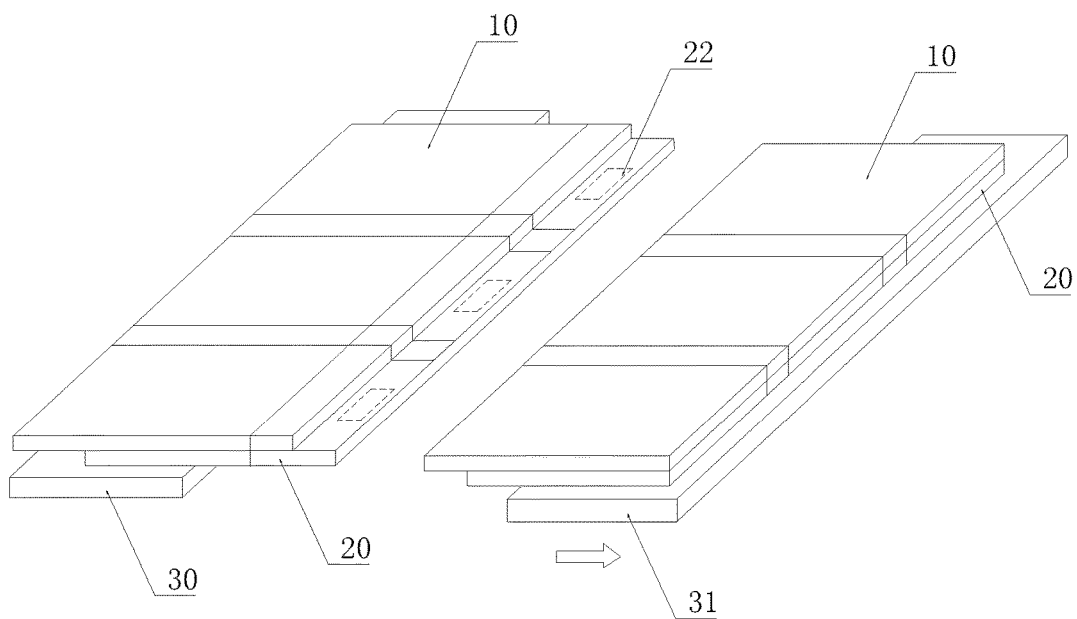
FIG. 2 is a side view showing the conventional liquid crystal panel motherboard.
Figure 3:
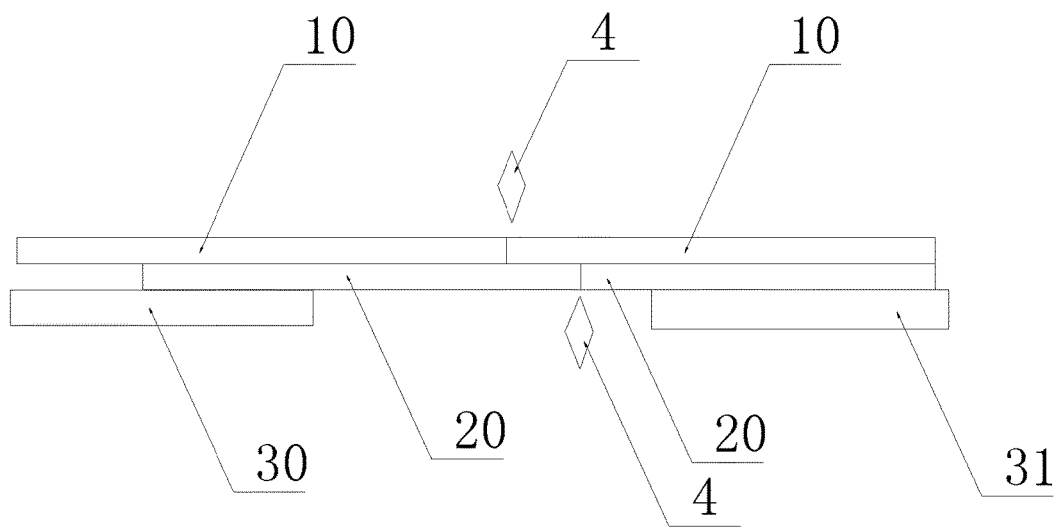
FIG. 3 is a schematic diagram showing the conventional liquid crystal panel motherboard which finishes being sliced.
Figure 4:
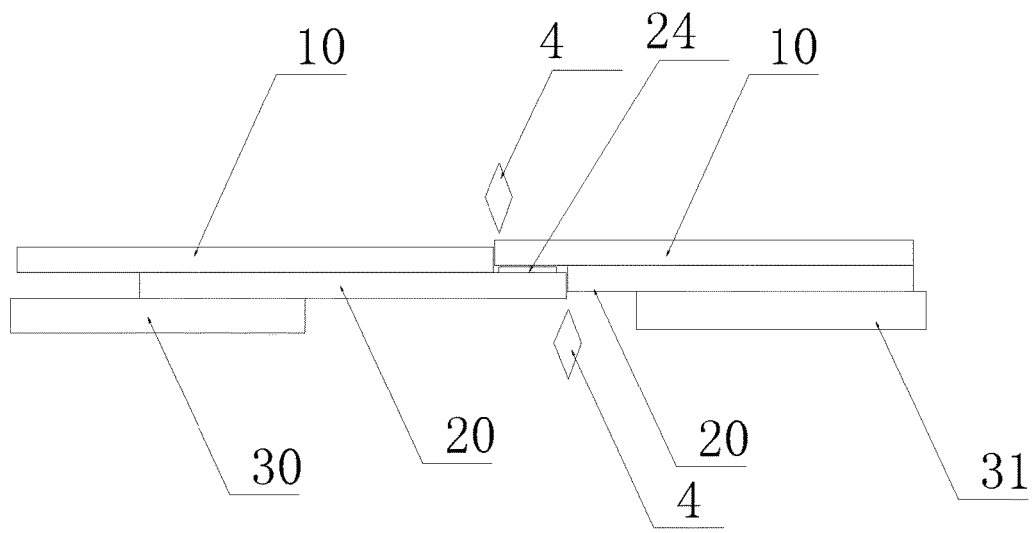
FIG. 4 is a side view showing a liquid crystal panel motherboard according to one embodiment of the present invention.
Figure 5:
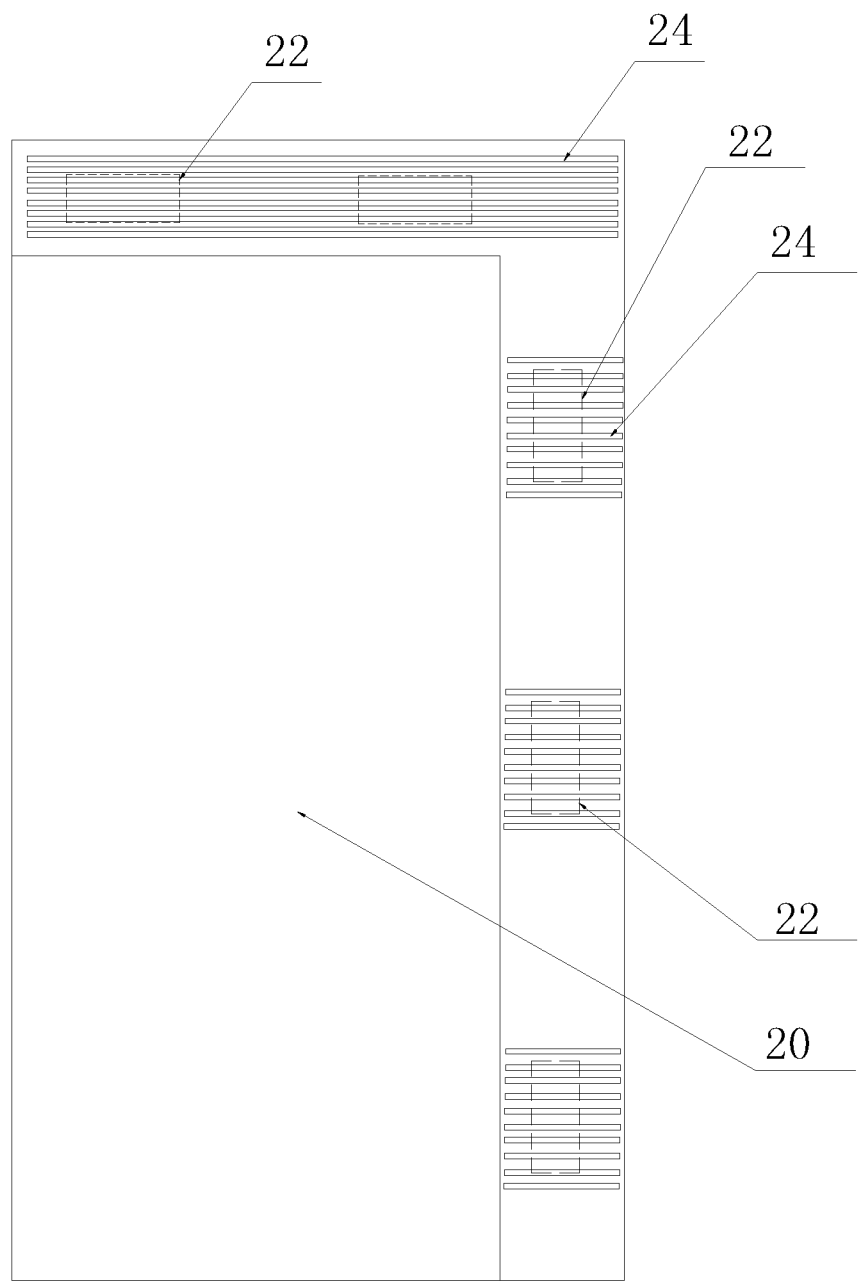
FIG. 5 is a schematic diagram showing a structure of a CF substrate.

FIG. 4 is a side view showing a liquid crystal panel motherboard according to one embodiment of the present invention. FIG. 5 is a schematic diagram showing a structure of a CF substrate. Please refer to FIG. 4 and FIG. 5 at the same time. The liquid crystal panel motherboard needing slicing in the present embodiment comprises a main substrate at one side of a TFT 1 and a main substrate at one side of a CF 2. The main substrate at the side of the TFT 1 is disposed on top of the main substrate at the side of the CF 2, and the two main substrates 1 and 2 are overlapped. The liquid crystal panel motherboard is capable of being sliced into at least a plurality of liquid crystal panels comprising a CF substrate 20 and a TFT substrate 10. A plurality of metallic terminal parts (not shown) and a display area used for driving a liquid crystal layer are formed on each of the TFT substrates 10. A contact area 22 (i.e., a dotted box shown in FIG. 5) which touches each of the metallic terminal parts is disposed on the CF substrate 20 correspondingly. The liquid crystal panel motherboard is disposed on an upper support platform 30 and a lower support platform 31. In one embodiment, the liquid crystal panel motherboard is sliced with a cutting knife 4 of a cutting machine. The main substrate at the side of the TFT 1 is sliced from top to bottom. The main substrate at the side of the CF 2 is sliced from bottom to top.

A soft protective film 24 is disposed on a contact area 22 touching each metallic terminal part of the TFT substrate 10 on the CF substrate 20. The thickness of the soft protective film 24 is not small, to a certain extent. The soft protective film 24 leans against its corresponding metallic terminal part corresponding to the TFT substrate 10 of the main substrate at the side of the TFT 1. In this way, metallic terminals in the metallic terminal part on the TFT substrate 10 will not be scraped when the liquid crystal panel motherboard is sliced. In a practical application, the metallic terminal can be a metallic thin wire.

As FIG. 5 shows, the soft protective film 24 comprises strips of soft protective films coated at intervals on the contact area 22 corresponding to the metallic terminal part. Or, the soft protective film 24 comprises a whole soft protective film coated on the contact area 22 corresponding to the metallic terminal part. All of the metallic terminals on the TFT substrate 10 have to be protected from being damaged during the process of separation of the liquid crystal panel, so each area coated with the soft protective film 24 on the CF substrate 20 is larger than its corresponding metallic terminal part on the TFT substrate 10. This design makes sure that the soft protective film 24 separates the metallic terminal on the TFT substrate 10 from the CF substrate 20 when the metallic terminal rubs the CF substrate 20 in the process of separation.

In a practical application, the thickness of the soft protective film 24 can be between 1 um to 4 um. The soft protective film 24 can be fabricated from some elastic material such as polystyrene (PS), polyethylene (PE), etc.

Figure 6:
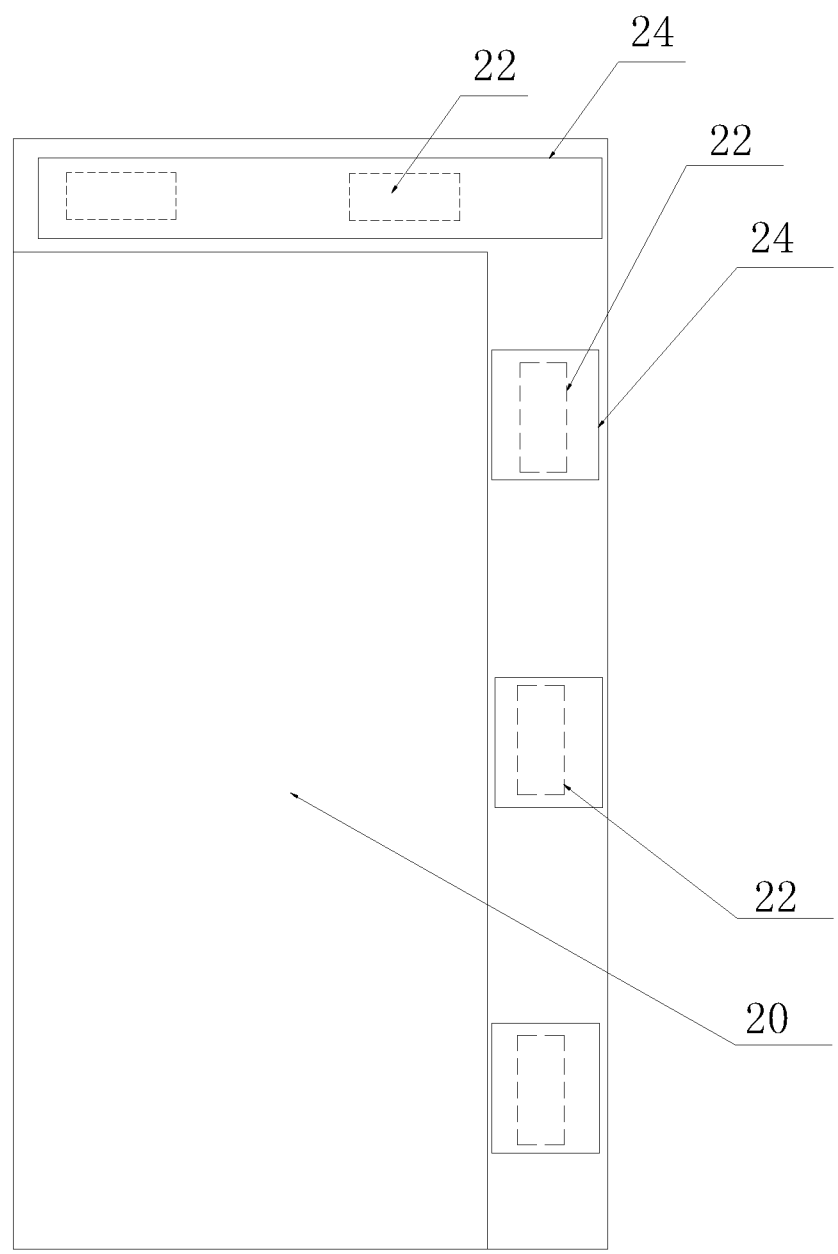
FIG. 6 is a schematic diagram showing a structure of a CF substrate of a liquid crystal panel motherboard according to another one embodiment of the present invention.

FIG. 6 is a schematic diagram showing a structure of a CF substrate of a liquid crystal panel motherboard according to another one embodiment of the present invention. The difference between the CF substrate shown in FIG. 5 and the CF substrate in this embodiment is that, a whole soft protective film is used in the soft protective film 24. The soft protective film is coated on the contact area 22 of the metallic terminal part in the TFT substrate. Except for the CF substrate, features and principles of other structures used in the liquid crystal panel motherboard in the present embodiment are similar to those used in the liquid crystal panel motherboard in the embodiment as shown in FIG. 5. No further details will be provided hereafter.

Correspondingly, a manufacturing method of a liquid crystal panel motherboard needing slicing is proposed in one embodiment of the present invention. The manufacturing method comprises following steps.

A main substrate at one side of a TFT is supplied. The main substrate at the side of the TFT is capable of sliced into a plurality of TFT substrates. A plurality of metallic terminal parts are formed on each of the plurality of TFT substrates. Specifically, the main substrate at the side of the TFT undergoes processes such as film formation, optical cement coating, photomask wax coating, development, etching, etc. Afterwards, a display area and a metallic terminal part are formed on the main substrate at the side of the TFT. The display area is used for driving a liquid crystal layer for showing images. The metallic terminal part is used for external electrical connections.

Supply a main substrate at one side of a CF. The main substrate at the side of the CF and the main substrate at the side of the TFT are disposed correspondingly, which means they two main substrates are overlapped. The main substrate at the side of the CF is capable of being sliced into CF substrates, and the CF substrates can be as many as the TFT substrates.

Form a plurality of color filter (CF) substrates on the main substrate at the side of the CF after the main substrate at the side of the CF undergoes some processes. Meanwhile, coat a soft protective film on a contact area where the main substrate at the side of the CF touches the metallic terminal part of the TFT substrate. The soft protective film comprises a certain thickness. The soft protective film leans against its corresponding metallic terminal part on the main substrate at the side of the TFT substrate. In this way, the metallic terminal in the metallic terminal part on the TFT substrate will not be scraped when the liquid crystal panel motherboard is sliced.

Glue the main substrate at the side of TFT to the main substrate at the side of the CF, and infuse liquid crystal into an area between the main substrate at the side of TFT and the main substrate at the side of the CF.

The practical process that the soft protective film is coated on a contact area where the main substrate at the side of the CF touches the metallic terminal part of the TFT substrate is that: a plurality of strips of soft protective films are coated at intervals on each of the contact areas of the main substrate at the side of the CF, or the soft protective film is completely coated on each of the contact areas of the main substrate at the side of the CF.

The area where the soft protective film is coated is larger than its corresponding metallic terminal part.

The soft protective film is fabricated from PS or PE.

The thickness of the soft protective film is between 1 and 4 um.

A plurality of CF substrates are formed on the main substrate at the side of the CF after the main substrate at the side of the CF undergoes some processes. The processes may comprise that a black thin film is not coated on the surface of the main substrate at the side of the CF, the black thin film is exposed and developed for forming a black matrix and a spacer, the black thin film is further exposed by using photomask for forming a color resistance region, and that colorful ink is infused into the color resistance region for forming a plurality of CF layers, thereby forming a CF substrate.

The embodiment of the present invention has the benefit as follows.

A soft protective film is disposed on a contact area where the CF substrate touches the metallic terminal part of the TFT substrate. The soft protective film is used as a buffer and for protecting the metallic terminal part of the TFT substrate from being rubbed by the CF substrate. Thus, the metallic terminal in the metallic terminal part of the TFT substrate is prevented from being scraped. In this way, success rate of slicing the liquid crystal panel motherboard is increased, thereby improving the production yield rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal panel motherboard needing slicing, comprising: a main substrate at one side of a thin film transistor (TFT) and a main substrate at one side of a color filter (CF), the main substrate at the side of the TFT disposed on top of the main substrate at the side of the CF, the main substrate at the side of the TFT and the main substrate at the side of the CF being overlapped, and the liquid crystal panel motherboard being capable of being sliced into at least two liquid crystal panels comprising a CF substrate and a TFT substrate along a first slicing line and a second slicing line;

a plurality of metallic terminal parts formed on the TFT substrate of each of the liquid crystal panels, a soft protective film disposed on a contact area which touches each of the plurality of metallic terminal parts disposed on the TFT substrate corresponding to the CF substrate, and an area where the soft protective film is coated on the CF substrate being larger than an area of a corresponding metallic terminal part, wherein the contact area is located between the first slicing line and a second slicing line;

wherein the soft protective film comprises a certain thickness and leans against a corresponding metallic terminal part on a corresponding TFT substrate for preventing a metallic terminal in the metallic terminal part on the TFT substrate from being scraped when the liquid crystal panel motherboard is sliced, wherein the soft protective film comprises strips of soft protective films coated at intervals on the contact area of the CF substrate which corresponds to the metallic terminal part.

2. The liquid crystal panel motherboard needing slicing as claimed in claim 1, wherein a thickness of the soft protective film is between 1 and 4 um.

3. The liquid crystal panel motherboard needing slicing as claimed in claim 2, wherein the soft protective film is fabricated from polystyrene (PS) or polyethylene (PE).

4. A manufacturing method of a liquid crystal panel motherboard needing slicing comprising following steps of:
supplying a main substrate at one side of a TFT, the main substrate at the side of the TFT being capable of being sliced into a plurality of TFT substrates along a first slicing line, and a plurality of metallic terminal parts being formed on each of the plurality of TFT substrates;
supplying a main substrate at one side of a CF, the main substrate at the side of the CF and the main substrate at the side of the TFT being disposed together and overlapped, the main substrate at the side of the CF being capable of being sliced into CF substrates along a second slicing line, and the CF substrates being as many as the TFT substrates;
forming a plurality of CF substrates on the main substrate at the side of the CF, and coating a soft protective film on a contact area where the motherboard at the side of the CF touches the metallic terminal part of the TFT substrate, wherein the soft protective film comprises a certain thickness and leans against a corresponding metallic terminal part on the main substrate at the side of the TFT substrate for preventing a metallic terminal in the metallic terminal part on the TFT substrate from being scraped when the liquid crystal panel motherboard is sliced, and an area where the soft protective film is coated is larger than an area of its corresponding metallic terminal part; and
gluing the main substrate at the side of TFT to the main substrate at the side of the CF, and infusing liquid crystal into an area between the main substrate at the side of TFT and the main substrate at the side of the CF,
wherein the contact area is located between the first slicing line and the second slicing line, and
wherein a plurality of strips of soft protective films are coated at intervals on each of the contact areas of the motherboard at the side of the CF.

5. The manufacturing method of the liquid crystal panel motherboard needing slicing as claimed in claim 4, wherein the soft protective film is fabricated from polystyrene (PS) or polyethylene (PE).

6. The manufacturing method of the liquid crystal panel motherboard needing slicing as claimed in claim 5, wherein a thickness of the soft protective film is between 1 and 4 um.

* * * * *